United States Patent [19]

Kruhn et al.

[11] 3,807,652

[45] Apr. 30, 1974

[54] TAPE CARTRIDGE AND REPRODUCTION INSTRUMENT THEREFOR

[75] Inventors: Jurgen Kruhn; Herbert Gunther; Jochen Laube, all of Constance, Germany

[73] Assignee: LICENTIA Patent-Verwaltungs-GmbH, Frankfurt am Main, Germany

[22] Filed: Apr. 26, 1971

[21] Appl. No.: 137,264

[30] Foreign Application Priority Data

Apr. 27, 1970 Germany........................... 2020418

[52] U.S. Cl................. 242/195, 242/71.8, 242/197, 242/210

[51] Int. Cl.... G03b 1/04, G11b 15/32, G11b 23/04

[58] Field of Search............ 242/192, 195, 197, 74, 242/71.8

[56] References Cited

UNITED STATES PATENTS

| | | | |
|---|---|---|---|
| 3,006,650 | 10/1961 | Ellmore | 242/197 UX |
| 3,379,387 | 4/1968 | Takahashi et al. | 242/195 |
| 3,539,132 | 11/1970 | Smitzer | 242/195 |
| 3,150,840 | 9/1964 | Briskin et al. | 242/195 |
| 3,208,682 | 9/1965 | Pastor et al. | 242/195 X |
| 3,254,856 | 6/1966 | Camras | 242/71.8 X |
| 3,544,040 | 12/1970 | Bundschuh | 242/210 |
| 3,282,521 | 11/1966 | Schuller et al. | 242/74 X |
| 3,126,161 | 3/1964 | Bemiss et al. | 242/195 |

*Primary Examiner*—John W. Huckert
*Assistant Examiner*—John M. Jillions
*Attorney, Agent, or Firm*—Spencer & Kaye

[57] ABSTRACT

A system including a tape cartridge containing a reel of tape whose leading end can be fed out of the cartridge by rotation of the reel and a recording and/or playback instrument for guiding the leading end onto a takeup reel, the tape having a stiff, resilient leader tape arranged to bear against the peripheral surface of the reel flange and to cooperate with the flange to be driven away from the reel when the latter rotates in its unwinding direction, the cartridge having a pressure element which urges the leader tape against the reel flange peripheral surface, and the instrument having a guide channel which guides the leader tape into engagement with the takeup reel.

10 Claims, 16 Drawing Figures

Inventors.
JÜRGEN KRÜHN
HERBERT GÜNTHER
JOCHEN LAUBE
BY Spencer & Kaye
ATTORNEYS.

Inventors.
JÜRGEN KRÜHN
HERBERT GÜNTHER
JOCHEN LAUBE
BY Spencer & Kaye
ATTORNEYS Inventors:
JÜRGEN KRÜHN
HERBERT GUNTHER
JOCHEN LAUBE
BY Spencer & Kaye
ATTORNEYS.

TAPE CARTRIDGE AND REPRODUCTION INSTRUMENT THEREFOR

BACKGROUND OF THE INVENTION

The present invention relates to tape recording/-playback instrument using tape cartridges, and particularly to systems for automatically threading a tape along its intended travel path and onto the instrument takeup reel.

Many arrangements of this type have already been proposed. For example, German Patent No. 1,249,927 discloses a cartridge containing a tape-type recording carrier which is wound on a reel, the carrier having its trailing end fastened to the core, or axle, of the reel and its beginning, or leading end, with a stiff leader tape which can be wound on the peripheral edges of the reel flange. The leader tape can be pushed out of the cartridge through a slit therein by a driving force acting in the unwinding direction and can then be pushed along a guide path of a recording and/or playback instrument in the direction toward its takeup device.

The case of the known cartridge has a cutout which exposes a section of the reel flange and of the leader tape. To start the advance of such a carrier, a drive roller from the recording and playback instrument extends into this cutout from the outside and exerts a frictional force on the leader tape in the unwinding direction so that it is pushed through a slit in the cartridge along a cylindrical guide sleeve in the case.

SUMMARY OF THE INVENTION

It is an object of the present invention to simplify and improve a cartridge of the above-mentioned type in such a manner as to eliminate the cutout in the cartridge case and the separate drive roller on the instrument for engaging in this cutout during the starting phase.

This is accomplished according to the present invention by providing in the cartridge one or more resilient pressure elements which press the leader tape against the peripheral edges of the reel flange, and by forming the surface of at least these peripheral edges to provide a sufficient driving force between such peripheral edges and the leader tape to push the leader tape out of the cartridge as soon as the reel is driven in the unwinding direction by the takeup hub of the recording and/or playback instrument.

The present invention further involves a special design of the recording and/or playback instrument to cooperate with such a cartridge.

DESCRIPTION OF THE PREFERRED EMBODIMENTS

Although the embodiments described below relate to cartridges as well as recording and/or playback instruments for magnetic tapes, the present invention is not limited to a particular species of tape-type recording instruments.

Figures 1, 2:
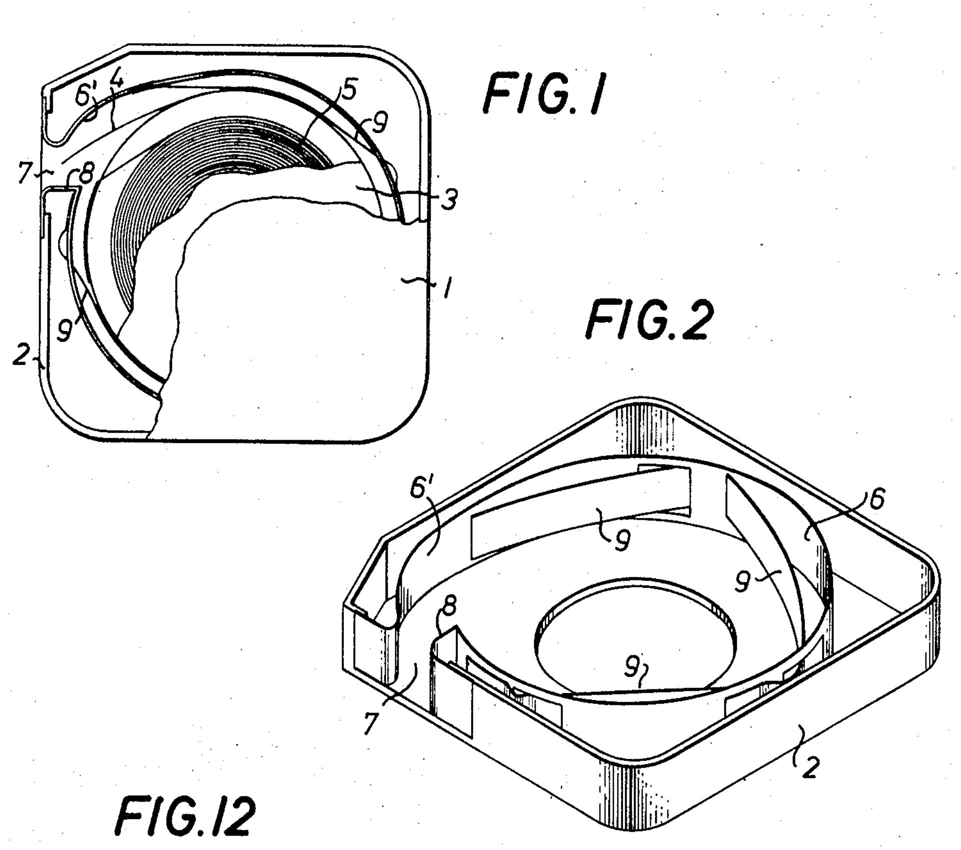
FIG. 1 is a plan view of one embodiment of a single-reel cartridge according to the present invention, a part of the cover and a part of the upper reel flange being cut away.
FIG. 2 is a perspective view of the lower portion of the cartridge of FIG. 1.

The cartridge shown in FIGS. 1 and 2 for a magnetic tape includes a case, or lower portion, 2 which is provided with a cover, or upper portion, 1, as well as a reel 3 which holds a magnetic tape 5 provided with a leader tape 4.

Figure 12:
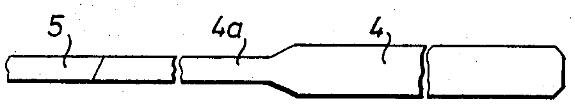
FIG. 12 is a plan view of a first embodiment of a leader tape according to the invention.

The leader tape 4 is wider than the magnetic tape, such arrangement being known, so that it contacts the peripheral edges of the reel flange 3' (FIG. 4) and it is relatively stiff so that it tends to assume a straight position and can therefore be pushed along a given guide path. As shown in FIG. 12, it may be provided with a section 4*a* where it joins to the magnetic tape 5, this section 4*a* having the same width as the magnetic tape.

In the embodiment of FIGS. 1 and 2, the cartridge is substantially of a square design. A guide sleeve 6 is provided within the cartridge in a known manner to be disposed concentrically about reel 3. Sleeve 6 opens at a radially widened portion 6' to a slit 7 of the cartridge. On the other side of the slit 7, there is arranged a guide surface 8 which extends obliquely with respect to the reel tangent and which dependably guides the starting portion of the leader tape into the slit during the starting process. Moreover, as can be seen in FIG. 2, three leaf springs 9 are fastened to the guide sleeve 6. These serve the purpose of pressing the leader tape 4 against the peripheral edges of the reel flange 3'. They are preferably narrow enough that they will not rest on the peripheral edges of the reel flange when the leader tape has been unwound but can pass therebetween.

Figure 3:
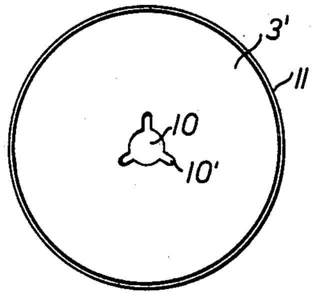
FIG. 3 is a plan view of an empty reel of the embodiment of FIG. 1.
Figure 4:
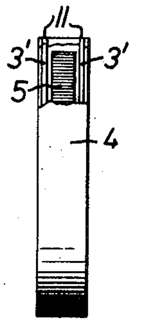
FIG. 4 is a side view of the reel of FIG. 3 with a tape wound thereon having a leader tape which is shown partially cut away.

Reel 3 is provided in the usual manner, as shown in FIGS. 3 and 4, with a takeup bore 10 around whose periphery three follower grooves 10' are distributed. The takeup hub (not shown) of the magnetic tape recorder is provided with a resiliently retreating follower which engages in one of grooves 10' as soon as it comes into alignment therewith. In a known manner the cartridge may be so designed that the reel is borne by the cartridge itself and the takeup hub of the instrument onto which the cartridge is placed exerts only a torque on the reel. But the cartridge can also be so designed, as is the case for the embodiment of FIGS. 1–4, that the reel is held in the cartridge substantially by the leaf springs 9 when the cartridge is not on the instrument and is centered and held by the takeup hub when the cartridge is placed on the instrument.

According to one feature of the present invention, the surface of at least the peripheral edges of the reel flange 3' is so designed that a driving force becomes effective between these peripheral edges and the leader tape sufficient to push the leader tape out of the cartridge as soon as reel 3 is driven in the unwinding direction by the takeup hub of the instrument. Several possibilities for the configuration of the above-mentioned surfaces will be explained below by way of examples.

In the embodiment of FIGS. 3 and 4 the peripheral edges of the reel flange 3' may be provided with a coating 11 which has a high coefficient of friction, as for example rubber. The driving force produced thereby can be applied to approximately one turn of the leader tape 4 if the latter has the form shown in FIG. 12. The leader tape should then not be substantially longer than one turn and when the distance of the cartridge from the takeup device of the recording and/or playback instrument is greater than one turn, special measures must be taken at the instrument in order to permit dependable automatic threading. These measures will be explained below.

Figure 13:
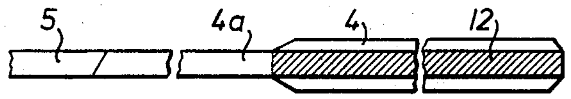
FIG. 13 is a view similar to that of FIG. 12 of a second embodiment of the leader tape.

A plurality of turns of the leader tape can be pushed out and advanced if the leader tape has the form shown in FIG. 13 wherein it itself is also provided with a coating 12 having a high coefficient of friction, which coating may also be of rubber. The coating transmits the driving force applied to the lowermost turn resting on the peripheral edges of the reel flange 3' from that turn to adjacent outer turns. The coating should be limited, however, to the center region of the leader tape so that it can be guided in the guide path or guide device of the recording and/or playback instrument with as little friction as possible.

Figure 15:
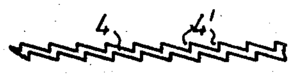
FIG. 15 is a side view to an enlarged scale of a section of the leader tape of FIG. 14.
Figure 14:
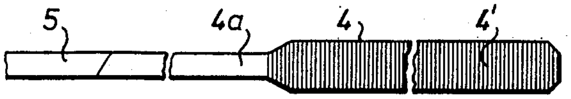
FIG. 14 is a view similar to that of FIG. 12 of a third embodiment of the leader tape.

Instead of providing the leader tape 4 with a coating 12 having a high coefficient of friction, as in the embodiment of FIG. 13, the leader tape may have the form shown in FIGS. 14 and 15, where it is provided with transverse grooves 4' on both wide surfaces. This also permits the dependable transfer of the driving force from the lowermost turn of the leader tape to the turns thereabove, particularly when the transverse grooves have a sawtooth-shaped profile, as shown in FIG. 15, so that the grooves on one turn lock into the grooves on an adjacent turn when the tape is advanced in the forward direction.

Figure 5:
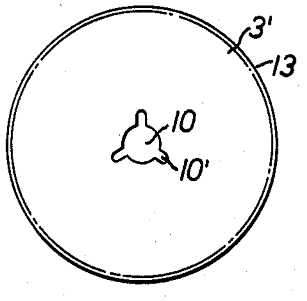
FIG. 5 is a plan view of the empty reel of a second embodiment of the invention.
Figure 6:
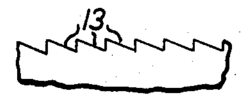
FIG. 6 is a pictorial view to a greatly enlarged scale of a peripheral edge of the reel of FIG. 5.

If a leader tape having the form shown in FIGS. 14 and 15 is employed, it is possible, as shown in FIGS. 5 and 6, to also provide the peripheral edges of the reel flange 3' with transverse grooves 13 which will mesh with the transverse grooves of the innermost turn of the leader tape. The transverse grooves, supported by the contact pressure of the leaf springs 9, act from the peripheral edges to the innermost turn and from there to the further turns of the leader tape in the manner of a form-fitting gearing.

For a recording and/or playback device to be suited for use with cartridges of the above-mentioned type, particularly for cartridges having the special features of the present invention, it must be provided with special components. These will be described below with reference to FIGS. 7 and 8 which illustrate one embodiment of a magnetic tape recorder.

The individual operating components of the magnetic tape recorder are fastened to, and extend below, a base plate 40. The cartridge 1, 2 is inserted into a mount consisting of angular pieces 41. The takeup hub 42 for the reel of the cartridge is seated on the shaft of the left-hand winding motor 43.

The right-hand winding motor 44 is provided with a takeup core 45 whose jacket surface has a high coefficient of friction. In a known manner, as disclosed for example in German Published Patent Application No. 1,156,439, the takeup device contains two guide bars 48 and 49 which conform to the circumference of the takeup core 45 and which are pivotal about axes 46 and 47, respectively, fixed to base plate 40. The guide bars are connected to a slide 52 by means of joints 50 and 51, respectively. This slide is displaceably mounted on bolts 55 and 56 by means of two slits 53 and 54. The slide may be brought from its rest position in the direction of the arrow into the illustrated position by means of a pulling magnet 57 against the action of a tension spring 58. In this position the guide bars 48 and 49 which were moved along with the slide are pivoted toward the takeup core 45 and are in light contact therewith. This position corresponds to the starting phase of the instrument. In the rest position the guide bar 49 takes up the position shown in dashed lines and the guide bar 48 has a corresponding position.

The magnetic tape recorder is provided with a combined recording and playback head 59, an erasing head 60 and guide pins 61. The capstan 62 is formed by the shaft of a motor 63. Moreover, a pressure roller 64 is provided which cooperates with the capstan and which is mounted on a lever 65 so that it can be brought into the operating position by a pulling magnet 66 against the opposition of a tension spring 67. Lever 65 is pivoted to base plate 40 at the point where its two arms meet.

Figure 7:
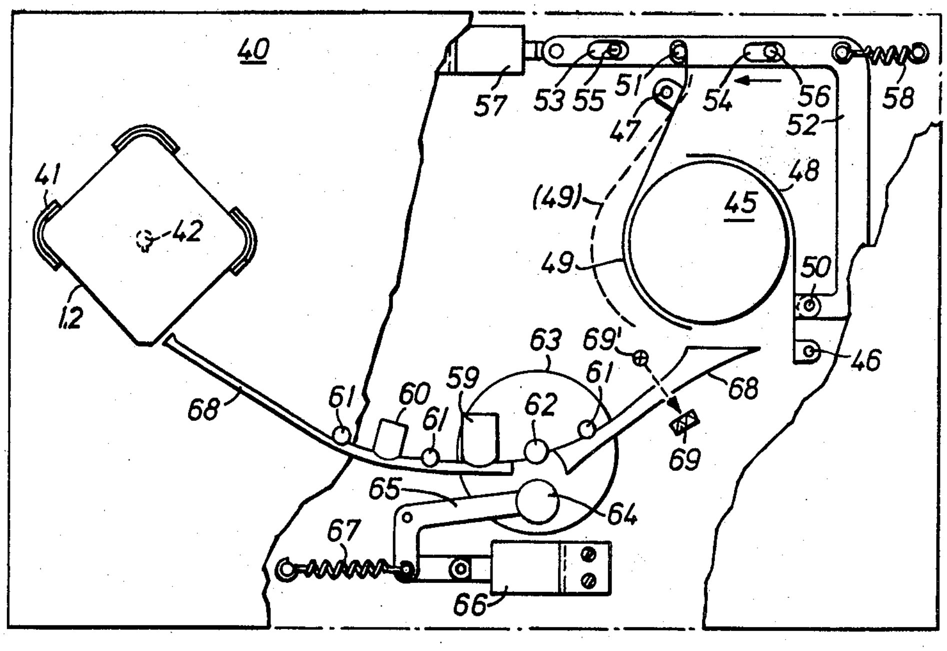
FIG. 7 is a plan view of a first embodiment of a magnetic tape recorder according to the invention for utilizing a cartridge according to the present invention, the recorder being shown with a partially cut-away base plate.

A guide path 68, which is illustrated only schematically, extends from the slit of the cartridge 1, 2, which slit is not visible in FIG. 7. The guide path serves to guide the leader tape 4, which is pushed out of the cartridge during the starting process, past heads 59, 60 and pins 61 into the gripping region of the winding core 45. It may be desirable under certain circumstances to provide a separate covering wall for the above-mentioned components which are disposed on the left-hand side of the guide path with respect to the view of FIG. 7, which wall is moved out of the tape plane during the recording or playback operations, in a direction either toward the top or toward the bottom.

Figures 9, 10, 11:
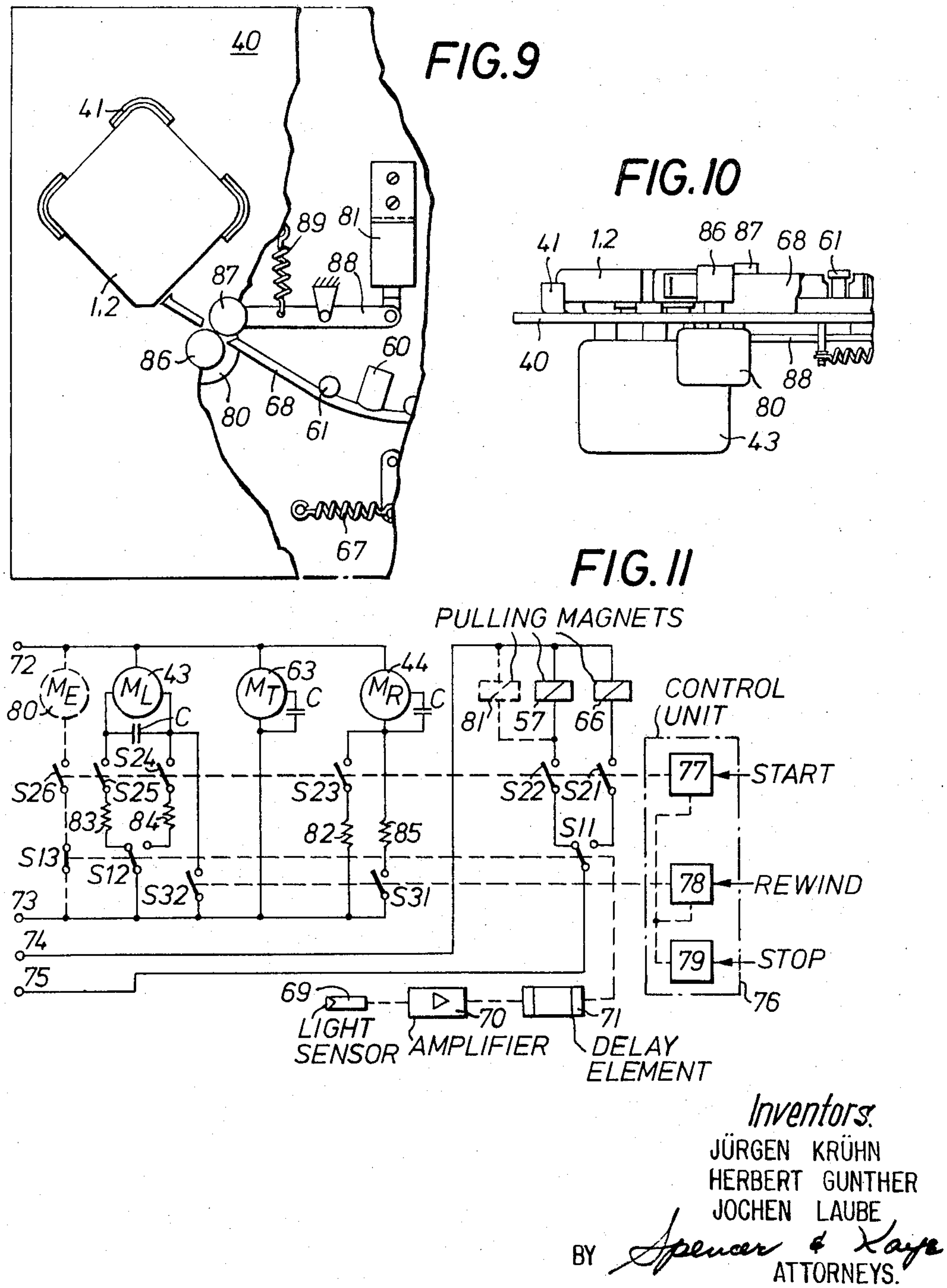
FIG. 9 is a partly cut-away plan view of a portion of a second embodiment of a magnetic tape recorder according to the invention.
FIG. 10 is a frontal view of the arrangement shown in FIG. 9.
FIG. 11 is a simplified schematic diagram of the electrical control of the magnetic tape recorders of FIGS. 7 and 8 and 9 and 10.

In the vicinity of the takeup core 45, a light barrier composed of a light source 69' and a light sensor 69 is disposed in the path of the tape and arranged to emit a signal when the light beam is interrupted by the leader tape 4 of the magnetic tape 5. As shown in FIG. 11, the signal from the light-sensitive member 69 is fed through an amplifier 70 to a delay stage 71 which effects a delay of approximately two seconds. Thereafter it effects, via simple switching means (not shown), actuation of switches S11 and S12. This switching means could, for example, be constituted by a relay.

FIG. 11 is a simplified circuit diagram illustrating the control of the operational steps of such a magnetic tape recorder. This diagram shows the left-hand winding motor 43, the right-hand winding motor 44 and the motor 63 bearing the capstan connected between the terminals 72 and 73 of the a.c. power source via various switches and resistors. A phase shift capacitor C is associated with each motor.

Motor 43 may be switched to rotate, with respect to the view of FIG. 7, clockwise for rewinding, or counterclockwise for feeding out the leader tape, depending on which side of its capacitor C is connected with terminal 73. The voltage supply terminals 74 and 75 can be connected, via various switches, to pulling magnets 57 and 66.

Depressing a START key closes switches S21, S22, S23, S24 and S25 via a control unit 76 and depressing a STOP key causes them to open again. Depressing a REWIND key actuates switches S31 and S32 via the control unit. These switches are also returned to their rest positions by depressing the STOP key, for example. Switching stages 77, 78 and 79 are provided for linking, in a known manner employed in studio tape recorders, the different control orders according to the operating state of the instrument and different conditions serving to maintain operational safety. These stages may be connected together either electrically or mechanically.

Figure 8:
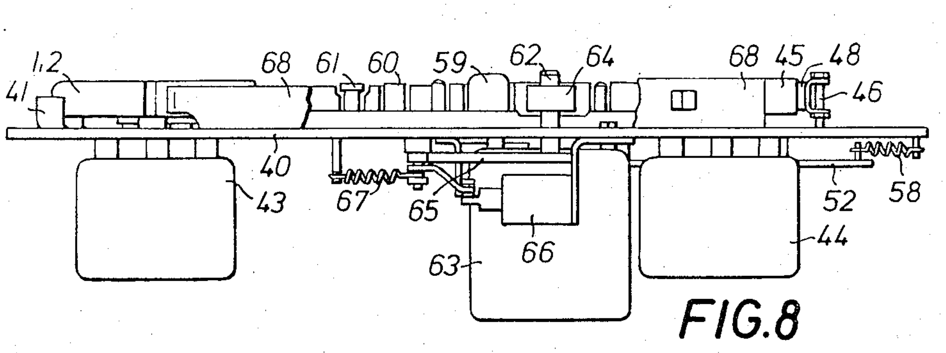
FIG. 8 is a frontal elevational view of the magnetic tape recorder of FIG. 7.

The switches S13 and S26, motor 80 and pulling magnet 81 shown in FIG. 11 do not form a part of the embodiment of FIGS. 7–8. They relate to a further embodiment of the tape recorder which will be discussed in connection with FIGS. 9 and 10.

The tape recorder of FIGS. 7, 8 and 11 can be placed in the following operational states:

Upon switching on the instrument, by connecting terminals 72 and 73 to an a.c. power supply, the capstan motor 63 starts up. All of the switches are in the position illustrated in FIG. 11. It is assumed that a cartridge 1, 2 of the type shown in FIGS. 1 to 6 has been placed onto the mount 41. If now switches S21 to S25 are closed due to the depression of the START key, pulling magnet 57 is excited via switches S11 and S22 so that guide bars 48 and 49 are pivoted toward takeup core 45 as shown in solid lines in FIG. 7. At the same time the right winding motor 44 starts up since it is supplied with power via resistor 82 and switch S23. Furthermore, switch S12 connects terminal 73 to resistor 83 and switch S25 connects resistor 83 to the left-hand winding motor 43 to rotate counterclockwise.

The left-hand winding motor 43 now drives the reel 3 of the cartridge 1, 2 via the takeup hub 42 in the unwinding direction. Because, during this rotation, leaf springs 9 urge leader tape 4 against flanges 3' of the reel to cause the flanges to apply a driving force to the leader tape, this tape is first pushed along the guide sleeve 6 of the cartridge, passes through slit 7 with the cooperation of the oblique guide surface 8, and is then pushed along guide path 68 of the magnetic tape recorder in the direction toward takeup core 45. The peripheral speed of the takeup core is a little greater than the speed with which the leader tape 4 advances.

As soon as the leader tape 4 reaches the effective range of the takeup device, i.e. between takeup core 45 and guide bar 48, it is gripped, as already described, and wound onto the takeup core.

When the leader tape interrupts the light barrier 69–69', sensor 69 produces a signal which, after the two second delay produced by element 71, actuates switches S11 and S12 at a time when the leader tape is already safely wound onto the takeup core 45. The magnetic tape recorder is thus automatically switched to "forward" for the recording or playback process. Actuating switch S11 causes the pulling magnet 57 to be switched off and, because switch S21 is already closed, connects pulling magnet 66. As a result, the guide bars 48 and 49 are pivoted away from takeup core 45 and the pressure roller 64 is pivoted against capstan 62. Actuating switch S12 switches the left-hand winding motor 43 via resistor 84 and switch S24, to tend to rotate clockwise, i.e. to apply a braking tension to tape 5.

Depressing the STOP key terminates the "forward" operational state in that switches S21 to S25 are brought into their rest position via switching stage 77. The winding motors 43 and 44 are switched off and pressure roller 64 is allowed to retract. With renewed depression of the START key, the "forward" operational state is established again.

If, after actuation of the STOP key, the REWIND key is depressed, the left-hand winding motor 43 is switched to be connected directly across the a.c. power source, via switch S32, to rotate in the clockwise direction with high torque, to rewind the tape, and the right-hand winding motor 44 is switched to be connected to the power source via switch 31 and resistor 85 to apply a braking force sufficient to tension the tape without preventing its rewinding. The magnetic tape 5 is rewound onto reel 3 of cartridge 1, 2, the leader tape 4 being finally wound onto the peripheral edges of the reel flange 3'. Depression of the STOP key then terminates the "rewind" operational state and the tape recorder is again in the ready position. The termination of the rewind process could of course also occur automatically by means of known switching and control means.

As already mentioned, FIGS. 7, 8 and 11 serve to illustrate only the basic principles of the design and operation of a tape recorder suited for the above-described cartridge. For this reason, no brakes, clutches, tape tension control or the like are mentioned here. Several of the control processes, such as, for example, the initiation of the "stop" operational state, can be realized in practice with other means which are known to those skilled in the art.

A further embodiment of a magnetic tape recorder suitable for the described cartridge is shown in FIGS. 9 and 10. This embodiment contains, between the cartridge 1, 2 and the takeup device, preferably between the cartridge and the magnetic head 60, a driven roller 86 which is disposed along the guide path 68 and which cooperates during the starting phase with a counter roller 87. In this embodiment, the roller 86 is disposed on the shaft of its own motor 80, which can be switched on via switches S13 and S26 shown in dashed lines in FIG. 11.

The peripheral speed of roller 86 is greater than the peripheral speed of reel 3 during the starting phase. The counter roller 87 is mounted on a pivot lever 88 which can be actuated against the effect of a tension spring 89 by a pulling magnet 81. The pulling magnet is connected electrically in parallel with the magnet 57 for guide bars 48 and 49, as shown in FIG. 11. Except for the added elements shown, the embodiment of FIGS. 9 and 10 is identical with that of FIGS. 7 and 8.

Upon depression of the START key of the magnetic tape recorder of FIGS. 9 and 10, motor 80 and pulling magnet 81 are switched on and the other operations described in connection with FIGS. 7, 8 and 11 are commenced. The leader tape 4, which has been pushed out of the cartridge 1, 2, is then gripped and pulled by rollers 86 and 87 and pushed on toward the takeup device 45, 48 and 49.

The magnetic tape recorder of FIGS. 9 and 10 has the advantage that the leader tape 4 need be pushed only over a short distance by the driving force existing between the peripheral edges of the reel flange 3' and the leader tape, i.e. up to rollers 86 and 87.

It is thus sufficient, for example, if the driving force is limited to exist only between the innermost turn of the leader tape and the peripheral edges of flange 3', as is the case for the embodiment of FIGS. 3, 4 and 12. The rollers 86 and 87 thus exert a favorable influence on the design of the cartridge and permit the attainment of high operational dependability even in the case of minimal cartridge design requirements.

Figure 16:
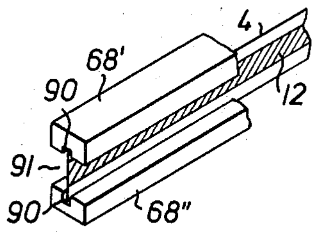
FIG. 16 is a perspective view of a guide path for the leader tape.

An advantageous possibility for the design of the guide path 68 of the leader tape 4 can be seen in FIG. 16 which shows the guide path to consist of two laterally spaced guide bars 68' and 68''. Each bar is provided with a groove 90 through which a respective lateral edge of the leader tape passes. The opening 91 defined between the two guide bars at the side of the tape facing the magnetic heads is wider than tape 5 and thus wide enough to permit the magnetic tape 5 which follows the leader tape to pass through this opening.

It will be understood that the above description of the present invention is susceptible to various modifications, changes and adaptations and the same are intended to be comprehended within the meaning and range of equivalents of the appended claims.

We claim:

1. In a cartridge housing a reel on which a tape-type recording carrier is wound, the trailing end of the carrier being fastened to the reel and its leading end being provided with a stiff, flexible leader tape windable onto the peripheral edges of the reel flange, the cartridge having an exit slit through which the leader tape tends to pass under the influence of a driving force rotating the reel in its tape feeding direction, the improvement comprising: at least one resilient pressure element disposed in said cartridge and arranged to press the leader tape against the peripheral edges of the reel flange; means on the surface of the peripheral edges of the reel flange constituted by a coating disposed to create a high coefficient of friction between said flange peripheral edges and the portion of the leader tape contacting said peripheral edges for applying to the leader tape a driving force effective to push the leader tape out through the cartridge exit slit when the reel is rotated in its tape feeding direction; and a friction coating disposed on said leader tape on a central region between its lateral edges for creating a high coefficient of friction between adjacent turns of said leader tape.

2. In a cartridge housing a reel on which a tape-type recording carrier is wound, the trailing end of the carrier being fastened to the reel and its leading end being provided with a stiff, flexible leader tape windable onto the peripheral edges of the reel flange, the cartridge having an exit slit through which the leader tape tends to pass under the influence of a driving force rotating the reel in its tape feeding direction, the improvement comprising: at least one resilient pressure element disposed in said cartridge and arranged to press the leader tape against the peripheral edges of the reel flange; and means on the surface of the peripheral edges of the reel flange for applying to the leader tape a driving force effective to push the leader tape out through the cartridge exit slit when the reel is rotated in its tape feeding direction; and wherein said leader tape presents two wide surfaces and is provided with transverse grooves on both of its wide surfaces.

3. An arrangement as defined in claim 2 wherein said means comprise transverse grooves which cooperate with the transverse grooves of the turn of said leader tape contacting said peripheral edge surface.

4. An arrangement as defined in claim 3 wherein said transverse grooves have a sawtooth-type profile such that said grooves on said leader tape lock with said grooves on said peripheral edge surface when said reel rotates in a direction to unwind said tape.

5. An arrangement as defined in claim 1 wherein said leader tape has a leading portion wider than said carrier and a section extending between said leading portion and said carrier, connected to said carrier, and having the same width as said carrier.

6. A recording and/or playback instrument comprising: a cartridge as defined in claim 3; means for directly engaging said reel of said cartridge to rotate it about its axis; means connected to said engaging means for rotating said reel in its feeding direction when the leader tape is disposed in said cartridge.

7. An arrangement as defined in claim 6, further comprising: a roller disposed adjacent the path followed by the tape leader after it leaves the cartridge; a counter roller; means for selectively moving said counter roller against said roller; and means for rotating said roller and counter roller in a direction to grip the leader tape and feed it toward a takeup device.

8. An arrangement as defined in claim 6, further including a takeup device comprising, in combination: a flangeless takeup reel; at least one guide bar shaped to conform to the peripheral surface of said takeup reel; and means supporting said bar for movement into a position in which said bar is closely adjacent such peripheral surface and guides the leader tape against such peripheral surface.

9. An arrangement as defined in claim 8 wherein said guide bar conforms to at least one-quarter the periphery of said takeup reel.

10. An arrangement as defined in claim 8 wherein there are two said guide bars disposed diametrically opposite one another with respect to the axis of said takeup reel and both attached to said supporting means for movement into such position.

* * * * *